UNITED STATES PATENT OFFICE 2,544,954

PREPARATION OF CELLULAR GLASS

Walter D. Ford, Port Allegany, Pa., assignor to Pittsburgh Corning Corporation, Allegheny County, Pa., a corporation of Pennsylvania No Drawing. Application March 31, 1945, Serial No. 586,031

1 Claim. (Cl. 49—77)

The present invention relates to the formation of a highly cellular, light weight body suitable for use as a heat insulation, as a buoyant material for floats and other purposes and it has particular relation to the formation of such bodies from glass.

One object is to provide a process of thermally treating a mixture of pulverized glass and a carbonaceous gassing agent such as carbon black, lamp black or the like, whereby to obtain a highly and uniformly cellulated product.

A second object is to provide a process of cooling the sintered and bloated body obtained by heating to sintering and bloating temperatures a mixture of finely powdered glass and a carbonaceous material as a gassing agent, whereby to reduce to a minimum shrinkage and distortion of the sintered body.

These and other objects will be apparent from consideration of the following specification and the appended claim.

It has heretofore been proposed to form highly cellulated, low density bodies suitable for use as a thermal insulating medium by heating an intimate mixture of finely powdered glass and finely powdered carbonaceous material, such as powdered coal. At an appropriate temperature, the particles of glass sinter together to give coherence, then the carbonaceous material reacts with certain constituents of the glass to generate bubbles of gases which by reason of their imprisonment in the sintered mass, expand and bloat the latter to give a body having good resistance to the transmission of heat combined with the resistance to moisture, chemical agencies, vermin, etc., characteristic of glass. Such process and product are described in Patent No. 2,123,536 to Bernard Long.

In the commercial operation of a process closely resembling that described in the patent, a number of difficulties have been encountered. For one thing, it was difficult to form bodies of more than two inches in thickness which were not characterized by excessive irregularity of cell structure.

It was further found that bodies, especially the thicker ones, tended excessively to shrink and dish during cooling, thus necessitating the cutting away and scrapping of excessive amounts of the product.

The present invention is based upon the discovery that these difficulties can, at least in large measure, be corrected by proper control of the schedule of the thermal treatment to which the mixture and the product are subjected.

Irregularity of cell structure can best be prevented by subjecting the mixture of powdered glass and powdered carbon to firing at a temperature sufficient to sinter the particles of glass together but insufficient to cause substantial generation of gases until the mixture has become completely, or at least deeply, sintered. The material should then be heated in a furnace or a furnace section heated 100° or 200° F. hotter in order to soften the sintered mass and to generate the bloating gases.

For purposes of preventing shrinkage and dishing of the sintered product, it is desirable to subject the cellulated body to rapidly decreasing temperatures for a short period of time in order to end cellulation in and to set an outer shell, then more slowly to cool the body to stop cellulation and to set the interior. Finally, the partially sintered product is annealed.

The presence of a small amount of antimony trioxide or arsenious trioxide in the glass-carbon mixture seems to be of assistance in reducing shrinkage and warpage, possibly by maintaining cellulation in the inner portions of the body until surface cooling is well on its way.

In the practice of the invention, various glass compositions are permissible. However, one embodying substantial amounts of an agent having active oxygen, e. g. $SO_3$ radical is desirable since the latter appears to be reduced by carbon to give off large volumes of free gas at temperatures above the sintering point of the glass. Most of the lime, soda, silica glasses sinter, at appropriate temperatures. The following is satisfactory:

| | Parts by weight |
|---|---|
| Sand | 55 |
| Soda ash | 18 |
| Dolomitic limestone (40% $MgCO_3$) | 15 |
| Feldspar | 12 |
| Salt cake | 5 |

These ingredients are susceptible of considerable variation and minor amounts of other ingredients can be included. Batches with the following ranges of proportions are feasible:

| | Parts by weight |
|---|---|
| Sand | 50 to 60 |
| Soda ash | 15 to 22 |
| Lime or dolomitic limestone | 12 to 20 |
| Feldspar | 9 to 16 |
| Salt cake | 3 to 8 |

These probably do not represent the extreme limits of variations of components. Soda ash can at least in part be replaced by potassium carbonate. The mixture should be fused down into glass at a temperature of about 2600° F. and preferably within a range of 2500° to 2700° F. or under such conditions as to maintain about 0.13% of dissolved $SO_3$ therein.

For purposes of this invention, the glass is finely pulverized so that 90% of it will pass a screen of 350 mesh. Pulverulent carbon, such as carbon black or lamp black, is also added. The ratio of carbonaceous material is susceptible of some variation. For carbon black, the range is about 0.1 to 0.2%. For lamp black, the range is about 0.5 to 2 or perhaps 2.5%. Excess carbonaceous material inhibits cellulation, possibly by preventing contact and sintering of contiguous glass particles.

These low percentages of carbonaceous material are best introduced into the mixture by introducing it into the cullet prior to or during grinding upon the ball mill. Antimony may be introduced into the mixture in ratio within the range of about 0.1 to 5%.

The mixture is placed in suitable quantity in a mold preferably of refractory steel. It can then be passed through a roller hearth furnace for purposes of heating it. The time schedule in the furnace is variable, dependent upon the thickness of the layer of pulverized material introduced into the mold. It, however, can be approximated by assuming that the transmission of heat varies as the square of the thickness of the layer. The time intervals in the following data are based upon a layer of powder in the mold of 1 inch thickness. A layer of 2 inches thickness would then require a heating period four times as long.

*Example*

A mold coated with hydrated alumina was charged to a depth of 1 inch with glass of a particle size, such that 70% would pass a screen of 300 mesh and containing 0.17% carbon black and an oxidizing agent such as 0.3% of antimony trioxide or calcium sulfate. It was then introduced into a roller hearth furnace having zones at appropriate temperatures along its length. This furnace, at the entrance end, was at a temperature of 1400° to 1450° F. The mold was maintained in this zone for about 40 minutes. At the end of that time, the glass was completely sintered, but there was very little cellulation. The mold was then moved into a zone where the temperature was 150 to 200° F. higher— that is, 1600° F. for a period of 30 minutes. During this period, cellulation proceeded rapidly until the sintered mass had bloated to a thickness of about 6¼ inches. The material was then moved through a zone which ranged from 1300° F. to 1200° F. for a period of about 10 minutes. It was then cooled in a zone at 1200° F. for 30 minutes. During this period, generation of gases in the hot zones deep in the block approximately compensated for shrinkage in the surface, due to cooling of gases. At the end of this period, a semi-rigid shell had formed on the block. The mold was then discharged from the furnace and the block was removed. The block was then further chilled to about 800° F., external temperature. This cooling produced a hard external shell, while the interior was yet soft. Collapse of the soft portions in the initial stages of annealing, due to cooling and shrinking of imprisoned gases, was prevented by the shell. The block was inserted in the lehr which, at its entrance end, was at a temperature of about 950° F. or above the annealing temperature of the glass. Of course, the glass at such temperature was fairly hard. The temperature was then dropped very gradually through the critical range of the glass or to about 850° F. Annealing and cooling required about 18 hours.

It is a characteristic of blocks or slabs of cellular glass so prepared that if stored in contact or close proximity to each other immediately upon emergence from the furnace, they tend to crack. However, if they are allowed to stand, spaced some 5 or 6 inches or more apart for two or three hours, this tendency disappears.

The blocks or slabs are uniformly and highly cellulated, the bubbles being of small size and also being closed so that there can be but little if any tendency for water and other liquid or gaseous fluids to permeate therein. Expansion is such that the blocks will be about 6¼ inches thick and will weigh about 10.5 lbs. per cubic foot.

I claim:

The method of producing a cellular glass body of uniform cellulation and without distortion, comprising steps of enclosing a uniformly mixed mass of finely pulverized glass, carbon black, and an oxidizing agent in a mold of the desired configuration, said glass sintering at a temperature materially below the temperature at which the carbon black oxidizes to form a gas, heating the mold and contents to a temperature above the sintering point of the glass and below the temperature at which said carbon black is oxidized, maintaining the mold and contents at said temperature until substantially all the glass is sintered, thereafter raising the temperature of the mold and contents to the temperature at which the carbon black oxidizes until the desired degree of cellulation is obtained, abruptly exposing the mold to a temperature below the sintering point and above the annealing point of the glass to substantially uniformly terminate cellulation on the exterior skin on the enclosed cellulated body, maintaining the mold at said temperature to substantially uniformly cool the body and promote a slow inward increase in the thickness of the layer of solidifying glass whereby active gas pressure is maintained on the interior cells of the body, which cell pressure slowly decreases in successive cell layers outwardly from the center of the cooling body, removing the body from the mold, and annealing the body.

WALTER D. FORD.

REFERENCES CITED

The following references are of record in the file of this patent:

UNITED STATES PATENTS

| Number | Name | Date |
| --- | --- | --- |
| 1,108,007 | Ribbe | Aug. 18, 1914 |
| 1,945,052 | Long | Jan. 30, 1934 |
| 2,123,536 | Long | July 12, 1938 |
| 2,143,951 | Lambert | Jan. 17, 1939 |
| 2,191,658 | Haux | Feb. 27, 1940 |
| 2,233,608 | Haux | Mar. 4, 1941 |
| 2,237,032 | Haux | Apr. 1, 1941 |
| 2,255,238 | Willis | Sept. 9, 1941 |
| 2,257,681 | Haux | Sept. 30, 1941 |
| 2,272,930 | Black | Feb. 10, 1942 |
| 2,401,582 | Owen | June 4, 1946 |